(12) United States Patent
Mathur et al.

(10) Patent No.: US 7,418,574 B2
(45) Date of Patent: Aug. 26, 2008

(54) CONFIGURING A PORTION OF A PIPELINE ACCELERATOR TO GENERATE PIPELINE DATE WITHOUT A PROGRAM INSTRUCTION

(75) Inventors: Chandan Mathur, Manassas, VA (US); Scott Hellenbach, Amissville, VA (US); John W. Rapp, Manassas, VA (US); Larry Jackson, Manassas, VA (US); Mark Jones, Centreville, VA (US); Troy Cherasaro, Culpeper, VA (US)

(73) Assignee: Lockheed Martin Corporation, Manassas, VA (US)

( * ) Notice: Subject to any disclaimer, the term of this patent is extended or adjusted under 35 U.S.C. 154(b) by 159 days.

(21) Appl. No.: 10/684,102

(22) Filed: Oct. 9, 2003

(65) Prior Publication Data
US 2004/0133763 A1    Jul. 8, 2004

Related U.S. Application Data

(60) Provisional application No. 60/422,503, filed on Oct. 31, 2002.

(51) Int. Cl.
*G06F 15/76* (2006.01)
(52) U.S. Cl. .................. 712/15; 712/2; 712/34
(58) Field of Classification Search ............ 712/2, 712/34, 15, 20
See application file for complete search history.

(56) References Cited

U.S. PATENT DOCUMENTS 4,873,626 A * 10/1989 Gifford .............. 710/120
4,956,771 A    9/1990 Neustaedter
5,583,964 A   12/1996 Wang (Continued)

FOREIGN PATENT DOCUMENTS

| EP | 0 694 847 A2 | 1/1996 |
|---|---|---|
| EP | 0 945 788 A2 | 9/1999 |
| EP | 1 061 438 A1 | 12/2000 |
| EP | 1 061 439 A1 | 12/2000 |
| EP | 0 945 788 A3 | 6/2002 |

OTHER PUBLICATIONS

Lecurieux-Lafayette G: "Un Seul FPGA Dope Le Traitement D'Images", Electronique, CEP Communication, Paris, FR, No. 55, 1996, pp. 98, 101-103.

(Continued)

*Primary Examiner*—Tonia L. Meonske
(74) *Attorney, Agent, or Firm*—Graybeal Jackson Haley LLP

(57) ABSTRACT

A peer-vector machine includes a host processor and a hard-wired pipeline accelerator. The host processor executes a program, and, in response to the program, generates host data, and the pipeline accelerator generates pipeline data from the host data. Alternatively, the pipeline accelerator generates the pipeline data, and the host processor generates the host data from the pipeline data. Because the peer-vector machine includes both a processor and a pipeline accelerator, it can often process data more efficiently than a machine that includes only processors or only accelerators. For example, one can design the peer-vector machine so that the host processor performs decision-making and non-mathematically intensive operations and the accelerator performs non-decision-making and mathematically intensive operations. By shifting the mathematically intensive operations to the accelerator, the peer-vector machine often can, for a given clock frequency, process data at a speed that surpasses the speed at which a processor-only machine can process the data.

34 Claims, 4 Drawing Sheets

U.S. PATENT DOCUMENTS

| | | | |
|---|---|---|---|
| 5,892,962 A | | 4/1999 | Cloutier |
| 6,023,742 A | * | 2/2000 | Ebeling et al. ............... 710/107 |
| 6,112,288 A | * | 8/2000 | Ullner ........................ 712/20 |
| 6,704,816 B1 | | 3/2004 | Burke |
| 2002/0087829 A1 | * | 7/2002 | Snyder et al. ................. 712/34 |
| 2004/0181621 A1 | | 9/2004 | Mathur et al. |

OTHER PUBLICATIONS

Vermeulen F. et al., "Flexible Hardware Acceleration for Multimedia Oriented Microprocessors", Micro-33. Proceedings of the 33$^{rd}$ Annual ACM/IEEE International Symposium on Microarchitecture. Monterey, CA, Dec. 10-13, 2000, Proceedings of the Annual ACM/IEEE International Symposium on Microarchitecture, Los Alamitos, CA: IEEE Comp. Soc, US, Dec. 10, 2000, pp. 171-177.

International Search Report for PCT/US 03/3455, Dec. 21, 2004.

International Search Report for PCT/US03/34559 dated Jan. 7, 2005.

International Search Report for PCT/US03/34558 dated Jun. 16, 2005.

Salcic Z et al., "FLIX environment for generation of custom-configurable machines in FPLDs for embedded applications", Microprocessors and Microsystems, IPC Business Press Ltd. London, GB, vol. 23, No. 8-9, Dec. 15, 1999, pp. 513-526.

International Search Report for PCT/US2005/035818 dated Aug. 4, 2006.

Bakshi S; Gajski D D; "Partitioning and Pipelining for Performance-Constrained Hardware/Software Systems", IEEE Transactions on Very Large Scale Integration (VLSI) Systems, vol. 7, NR. 4, p. 419-432, (1999-12-00), XP000869229.

* cited by examiner

CONFIGURING A PORTION OF A PIPELINE ACCELERATOR TO GENERATE PIPELINE DATE WITHOUT A PROGRAM INSTRUCTION

CLAIM OF PRIORITY

This application claims priority to U.S. Provisional Application Ser. No. 60/422,503, filed on Oct. 31, 2002, which is incorporated by reference.

CROSS REFERENCE TO RELATED APPLICATIONS

This application is related to U.S. Publication Nos. 2004/0181621 entitled COMPUTING MACHINE HAVING IMPROVED COMPUTING ARCHITECTURE AND RELATED SYSTEM AND METHOD; 2004/0136241 entitled PIPELINE ACCELERATOR FOR IMPROVED COMPUTING ARCHITECTURE AND RELATED SYSTEM AND METHOD; 2004/0170070 entitled PROGRAMMABLE CIRCUIT AND RELATED COMPUTING MACHINE AND METHOD; and 2004/0130927 entitled PIPELINE ACCELERATOR HAVING MULTIPLE PIPELINE UNITS AND RELATED COMPUTING MACHINE AND METHOD; all filed on Oct. 9, 2003 and having a common owner.

BACKGROUND

A common computing architecture for processing relatively large amounts of data in a relatively short period of time includes multiple interconnected processors that share the processing burden. By sharing the processing burden, these multiple processors can often process the data more quickly than a single processor can for a given clock frequency. For example, each of the processors can process a respective portion of the data or execute a respective portion of a processing algorithm.

FIG. 1 is a schematic block diagram of a conventional computing machine 10 having a multi-processor architecture. The machine 10 includes a master processor 12 and coprocessors $14_1$-$14_n$, which communicate with each other and the master processor via a bus 16, an input port 18 for receiving raw data from a remote device (not shown in FIG. 1), and an output port 20 for providing processed data to the remote source. The machine 10 also includes a memory 22 for the master processor 12, respective memories $24_1$-$24_n$ for the coprocessors $14_1$-$14_n$, and a memory 26 that the master processor and coprocessors share via the bus 16. The memory 22 serves as both a program and a working memory for the master processor 12, and each memory $24_1$-$24_n$ serves as both a program and a working memory for a respective coprocessor $14_1$-$14_n$. The shared memory 26 allows the master processor 12 and the coprocessors 14 to transfer data among themselves, and from/to the remote device via the ports 18 and 20, respectively. The master processor 12 and the coprocessors 14 also receive a common clock signal that controls the speed at which the machine 10 processes the raw data.

In general, the computing machine 10 effectively divides the processing of raw data among the master processor 12 and the coprocessors 14. The remote source (not shown in FIG. 1) such as a sonar array (FIG. 5) loads the raw data via the port 18 into a section of the shared memory 26, which acts as a first-in-first-out (FIFO) buffer (not shown) for the raw data. The master processor 12 retrieves the raw data from the memory 26 via the bus 16, and then the master processor and the coprocessors 14 process the raw data, transferring data among themselves as necessary via the bus 16. The master processor 12 loads the processed data into another FIFO buffer (not shown) defined in the shared memory 26, and the remote source retrieves the processed data from this FIFO via the port 20.

In an example of operation, the computing machine 10 processes the raw data by sequentially performing n+1 respective operations on the raw data, where these operations together compose a processing algorithm such as a Fast Fourier Transform (FFT). More specifically, the machine 10 forms a data-processing pipeline from the master processor 12 and the coprocessors 14. For a given frequency of the clock signal, such a pipeline often allows the machine 10 to process the raw data faster than a machine having only a single processor.

After retrieving the raw data from the raw-data FIFO (not shown) in the memory 26, the master processor 12 performs a first operation, such as a trigonometric function, on the raw data. This operation yields a first result, which the processor 12 stores in a first-result FIFO (not shown) defined within the memory 26. Typically, the processor 12 executes a program stored in the memory 22, and performs the above-described actions under the control of the program. The processor 12 may also use the memory 22 as working memory to temporarily store data that the processor generates at intermediate intervals of the first operation.

Next, after retrieving the first result from the first-result FIFO (not shown) in the memory 26, the coprocessor $14_1$ performs a second operation, such as a logarithmic function, on the first result. This second operation yields a second result, which the coprocessor $14_1$ stores in a second-result FIFO (not shown) defined within the memory 26. Typically, the coprocessor $14_1$ executes a program stored in the memory $24_1$, and performs the above-described actions under the control of the program. The coprocessor $14_1$ may also use the memory $24_1$ as working memory to temporarily store data that the coprocessor generates at intermediate intervals of the second operation.

Then, the coprocessors $24_2$-$24_n$ sequentially perform third—$n^{th}$ operations on the second—$(n-1)^{th}$ results in a manner similar to that discussed above for the coprocessor $24_1$.

The $n^{th}$ operation, which is performed by the coprocessor $24_n$, yields the final result, i.e., the processed data. The coprocessor $24_n$ loads the processed data into a processed-data FIFO (not shown) defined within the memory 26, and the remote device (not shown in FIG. 1) retrieves the processed data from this FIFO.

Because the master processor 12 and coprocessors 14 are simultaneously performing different operations of the processing algorithm, the computing machine 10 is often able to process the raw data faster than a computing machine having a single processor that sequentially performs the different operations. Specifically, the single processor cannot retrieve a new set of the raw data until it performs all n+1 operations on the previous set of raw data. But using the pipeline technique discussed above, the master processor 12 can retrieve a new set of raw data after performing only the first operation. Consequently, for a given clock frequency, this pipeline technique can increase the speed at which the machine 10 processes the raw data by a factor of approximately n+1 as compared to a single-processor machine (not shown in FIG. 1).

Alternatively, the computing machine 10 may process the raw data in parallel by simultaneously performing n+1 instances of a processing algorithm, such as an FFT, on the raw data. That is, if the algorithm includes n+1 sequential operations as described above in the previous example, then each of the master processor 12 and the coprocessors 14 sequentially perform all n+1 operations on respective sets of the raw data. Consequently, for a given clock frequency, this parallel-processing technique, like the above-described pipeline technique, can increase the speed at which the machine 10 processes the raw data by a factor of approximately n+1 as compared to a single-processor machine (not shown in FIG. 1).

Unfortunately, although the computing machine 10 can process data more quickly than a single-processor computer machine (not shown in FIG. 1), the data-processing speed of the machine 10 is often significantly less than the frequency of the processor clock. Specifically, the data-processing speed of the computing machine 10 is limited by the time that the master processor 12 and coprocessors 14 require to process data. For brevity, an example of this speed limitation is discussed in conjunction with the master processor 12, although it is understood that this discussion also applies to the coprocessors 14. As discussed above, the master processor 12 executes a program that controls the processor to manipulate data in a desired manner. This program includes a sequence of instructions that the processor 12 executes. Unfortunately, the processor 12 typically requires multiple clock cycles to execute a single instruction, and often must execute multiple instructions to process a single value of data. For example, suppose that the processor 12 is to multiply a first data value A (not shown) by a second data value B (not shown). During a first clock cycle, the processor 12 retrieves a multiply instruction from the memory 22. During second and third clock cycles, the processor 12 respectively retrieves A and B from the memory 26. During a fourth clock cycle, the processor 12 multiplies A and B, and, during a fifth clock cycle, stores the resulting product in the memory 22 or 26 or provides the resulting product to the remote device (not shown). This is a best-case scenario, because in many cases the processor 12 requires additional clock cycles for overhead tasks such as initializing and closing counters. Therefore, at best the processor 12 requires five clock cycles, or an average of 2.5 clock cycles per data value, to process A and B.

Consequently, the speed at which the computing machine 10 processes data is often significantly lower than the frequency of the clock that drives the master processor 12 and the coprocessors 14. For example, if the processor 12 is clocked at 1.0 Gigahertz (GHz) but requires an average of 2.5 clock cycles per data value, than the effective data-processing speed equals (1.0 GHz)/2.5=0.4 GHz. This effective data-processing speed is often characterized in units of operations per second. Therefore, in this example, for a clock speed of 1.0 GHz, the processor 12 would be rated with a data-processing speed of 0.4 Gigaoperations/second (Gops).

FIG. 2 is a block diagram of a hardwired data pipeline 30 that can typically process data faster than a processor can for a given clock frequency, and often at substantially the same rate at which the pipeline is clocked. The pipeline 30 includes operator circuits $32_1$-$32_n$ that each perform a respective operation on respective data without executing program instructions. That is, the desired operation is "burned in" to a circuit 32 such that it implements the operation automatically, without the need of program instructions. By eliminating the overhead associated with executing program instructions, the pipeline 30 can typically perform more operations per second than a processor can for a given clock frequency.

For example, the pipeline 30 can often solve the following equation faster than a processor can for a given clock frequency:

$$Y(x_k) = (5x_k+3)2^{x_k} \quad (1)$$

where $x_k$ represents a sequence of raw data values. In this example, the operator circuit $32_1$ is a multiplier that calculates $5x_k$, the circuit $32_2$ is an adder that calculates $5x_k+3$, and the circuit $32_n$ (n=3) is a multiplier that calculates $(5x_k+3)2^{x_k}$.

During a first clock cycle k=1, the circuit $32_1$ receives data value $x_1$ and multiplies it by 5 to generate $5x_1$.

During a second clock cycle k=2, the circuit $32_2$ receives $5x_1$ from the circuit $32_1$ and adds 3 to generate $5x_1+3$. Also, during the second clock cycle, the circuit $32_1$ generates $5x_2$.

During a third clock cycle k=3, the circuit 323 receives $5x_1+3$ from the circuit $32_2$ and multiplies by $2^{x_1}$ (effectively right shifts $5x_1+3$ by $x_1$) to generate the first result $(5x_1+3)2^{x_1}$. Also during the third clock cycle, the circuit $32_1$ generates $5x_3$ and the circuit $32_2$ generates $5x_2+3$.

The pipeline 30 continues processing subsequent raw data values $x_k$ in this manner until all the raw data values are processed.

Consequently, a delay of two clock cycles after receiving a raw data value $x_1$—this delay is often called the latency of the pipeline 30—the pipeline generates the result $(5x_1+3)2^{x_1}$, and thereafter generates one result each clock cycle.

Disregarding the latency, the pipeline 30 thus has a data-processing speed equal to the clock speed. In comparison, assuming that the master processor 12 and coprocessors 14 (FIG. 1) have data-processing speeds that are 0.4 times the clock speed as in the above example, the pipeline 30 can process data 2.5 times faster than the computing machine 10 (FIG. 1) for a given clock speed.

Still referring to FIG. 2, a designer may choose to implement the pipeline 30 in a programmable logic IC (PLIC), such as a field-programmable gate array (FPGA), because a PLIC allows more design and modification flexibility than does an application specific IC (ASIC). To configure the hardwired connections within a PLIC, the designer merely sets interconnection-configuration registers disposed within the PLIC to predetermined binary states. The combination of all these binary states is often called "firmware." Typically, the designer loads this firmware into a nonvolatile memory (not shown in FIG. 2) that is coupled to the PLIC. When one "turns on" the PLIC, it downloads the firmware from the memory into the interconnection-configuration registers. Therefore, to modify the functioning of the PLIC, the designer merely modifies the firmware and allows the PLIC to download the modified firmware into the interconnection-configuration registers. This ability to modify the PLIC by merely modifying the firmware is particularly useful during the prototyping stage and for upgrading the pipeline 30 "in the field".

Unfortunately, the hardwired pipeline 30 typically cannot execute all algorithms, particularly those that entail significant decision making. A processor can typically execute a decision-making instruction (e.g., conditional instructions such as "if A, then go to B, else go to C") approximately as fast as it can execute an operational instruction (e.g., "A+B") of comparable length. But although the pipeline 30 may be able to make a relatively simple decision (e.g., "A>B?"), it typically cannot execute a relatively complex decision (e.g., "if A, then go to B, else go to C"). And although one may be able to design the pipeline 30 to execute such a complex decision, the size and complexity of the required circuitry often makes such a design impractical, particularly where an algorithm includes multiple different complex decisions.

Consequently, processors are typically used in applications that require significant decision making, and hardwired pipelines are typically limited to "number crunching" applications that entail little or no decision making.

Furthermore, as discussed below, it is typically much easier for one to design/modify a processor-based computing machine, such as the computing machine 10 of FIG. 1, than it is to design/modify a hardwired pipeline such as the pipeline 30 of FIG. 2, particularly where the pipeline 30 includes multiple PLICs.

Computing components, such as processors and their peripherals (e.g., memory), typically include industry-standard communication interfaces that facilitate the interconnection of the components to form a processor-based computing machine.

Typically, a standard communication interface includes two layers: a physical layer and an service layer.

The physical layer includes the circuitry and the corresponding circuit interconnections that form the interface and the operating parameters of this circuitry. For example, the physical layer includes the pins that connect the component to a bus, the buffers that latch data received from the pins, and the drivers that drive data onto the pins. The operating parameters include the acceptable voltage range of the data signals that the pins receive, the signal timing for writing and reading data, and the supported modes of operation (e.g., burst mode, page mode). Conventional physical layers include transistor-transistor logic (TTL) and RAMBUS.

The service layer includes the protocol by which a computing component transfers data. The protocol defines the format of the data and the manner in which the component sends and receives the formatted data. Conventional communication protocols include file-transfer protocol (FTP) and TCP/IP (expand).

Consequently, because manufacturers and others typically design computing components having industry-standard communication layers, one can typically design the interface of such a component and interconnect it to other computing components with relatively little effort. This allows one to devote most of his time to the designing the other portions of the computing machine, and to easily modify the machine by adding or removing components.

Designing a computing component that supports an industry-standard communication layer allows one to save design time by using an existing physical-layer design from a design library. This also insures that he/she can easily interface the component to off-the-shelf computing components.

And designing a computing machine using computing components that support a common industry-standard communication layer allows the designer to interconnect the components with little time and effort. Because the components support a common interface layer, the designer can interconnect them via a system bus with little design effort. And because the supported interface layer is an industry standard, one can easily modify the machine. For example, one can add different components and peripherals to the machine as the system design evolves, or can easily add/design next-generation components as the technology evolves. Furthermore, because the components support a common industry-standard service layer, one can incorporate into the computing machine's software an existing software module that implements the corresponding protocol. Therefore, one can interface the components with little effort because the interface design is essentially already in place, and thus can focus on designing the portions (e.g., software) of the machine that cause the machine to perform the desired function(s).

But unfortunately, there are no known industry-standard communication layers for components, such as PLICs, used to form hardwired pipelines such as the pipeline 30 of FIG. 2.

Consequently, to design a pipeline having multiple PLICs, one typically spends a significant amount of time and exerts a significant effort designing and debugging the communication layer between the PLICs "from scratch." Typically, such an ad hoc communication layer depends on the parameters of the data being transferred between the PLICs. Likewise, to design a pipeline that interfaces to a processor, one would have to spend a significant amount of time and exert a significant effort in designing and debugging the communication layer between the pipeline and the processor from scratch.

Similarly, to modify such a pipeline by adding a PLIC to it, one typically spends a significant amount of time and exerts a significant effort designing and debugging the communication layer between the added PLIC and the existing PLICs. Likewise, to modify a pipeline by adding a processor, or to modify a computing machine by adding a pipeline, one would have to spend a significant amount of time and exert a significant effort in designing and debugging the communication layer between the pipeline and processor.

Consequently, referring to FIGS. 1 and 2, because of the difficulties in interfacing multiple PLICs and in interfacing a processor to a pipeline, one is often forced to make significant tradeoffs when designing a computing machine. For example, with a processor-based computing machine, one is forced to trade number-crunching speed for complex decision-making ability and design/modification flexibility. Conversely, with a hardwired pipeline-based computing machine, one is forced to trade complex-decision-making ability and design/modification flexibility for number-crunching speed. Furthermore, because of the difficulties in interfacing multiple PLICs, it is often impractical for one to design a pipeline-based machine having more than a few PLICs. As a result, a practical pipeline-based machine often has limited functionality. And because of the difficulties in interfacing a processor to a PLIC, it would be impractical to interface a processor to more than one PLIC. As a result, the benefits obtained by combining a processor and a pipeline would be minimal.

Therefore, a need has arisen for a new computer architecture that allows one to combine the decision-making ability of a processor-based machine with the number-crunching speed of a hardwired-pipeline-based machine.

SUMMARY

In an embodiment of the invention, a peer-vector machine includes a host processor and a hardwired pipeline accelerator. The host processor executes a program, and, in response to the program, generates host data, and the pipeline accelerator generates pipeline data from the host data.

According to another embodiment of the invention, the pipeline accelerator generates the pipeline data, and the host processor generates the host data from the pipeline data.

Because the peer-vector machine includes both a processor and a hardwired pipeline accelerator, it can often process data more efficiently than a computing machine that includes only processors or only hardwired pipelines. For example, one can design the peer vector machine so that the host processor performs decision-making and non-mathematically intensive operations while the accelerator performs mathematically intensive operations. By shifting the mathematically intensive operations to the accelerator, the peer-vector machine often can, for a given clock frequency, process data at a speed that surpasses the speed at which a processor-only machine can process the data.

DETAILED DESCRIPTION

Figure 1:
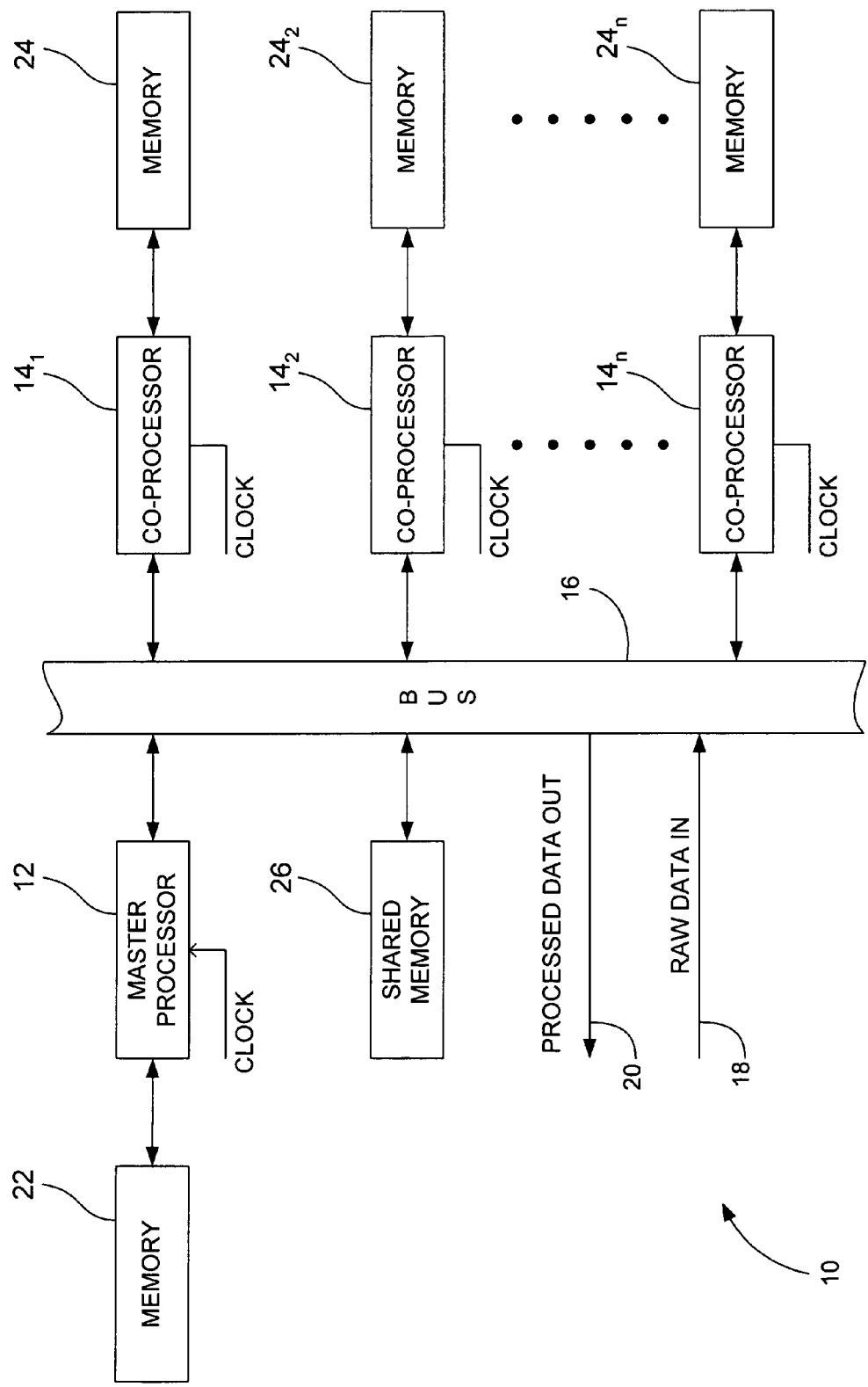
FIG. 1 is a block diagram of a computing machine having a conventional multi-processor architecture.
Figure 3:
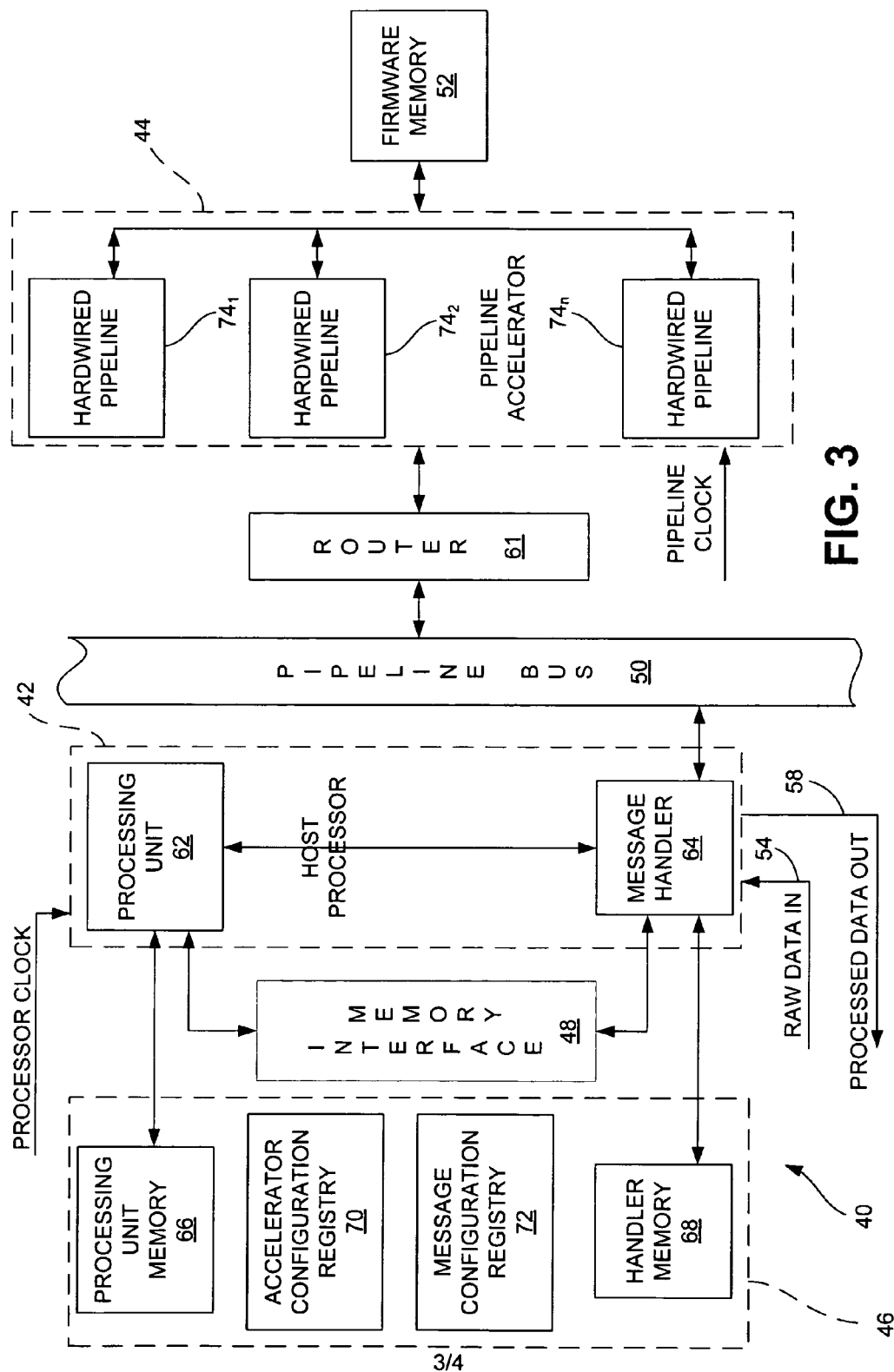
FIG. 3 is schematic block diagram of a computing machine having a peer-vector architecture according to an embodiment of the invention.

FIG. 3 is a schematic block diagram of a computing machine 40, which has a peer-vector architecture according to an embodiment of the invention. In addition to a host processor 42, the peer-vector machine 40 includes a pipeline accelerator 44, which performs at least a portion of the data processing, and which thus effectively replaces the bank of coprocessors 14 in the computing machine 10 of FIG. 1. Therefore, the host-processor 42 and the accelerator 44 are "peers" that can transfer data vectors back and forth. Because the accelerator 44 does not execute program instructions, it typically performs mathematically intensive operations on data significantly faster than a bank of coprocessors can for a given clock frequency. Consequently, by combing the decision-making ability of the processor 42 and the number-crunching ability of the accelerator 44, the machine 40 has the same abilities as, but can often process data faster than, a conventional computing machine such as the machine 10. Furthermore, as discussed in previously cited U.S. Publication Nos. 2004/0181621 entitled COMPUTING MACHINE HAVING IMPROVED COMPUTING ARCHITECTURE AND RELATED SYSTEM AND METHOD and 2004/0136241 entitled PIPELINE ACCELERATOR FOR IMPROVED COMPUTING ARCHITECTURE AND RELATED SYSTEM AND METHOD, providing the accelerator 44 with the same communication layer as the host processor 42 facilitates the design and modification of the machine 40, particularly where the communications layer is an industry standard. And where the accelerator 44 includes multiple components (e.g., PLICs), providing these components with this same communication layer facilitates the design and modification of the accelerator, particularly where the communication layer is an industry standard. Moreover, the machine 40 may also provide other advantages as described below and in the previously cited patent applications.

In addition to the host processor 42 and the pipeline accelerator 44, the peer-vector computing machine 40 includes a processor memory 46, an interface memory 48, a bus 50, a firmware memory 52, optional raw-data input ports 54 and 92 (port 92 shown in FIG. 4), optional processed-data output ports 58 and 94 (port 94 shown in FIG. 4), and an optional router 61.

The host processor 42 includes a processing unit 62 and a message handler 64, and the processor memory 46 includes a processing-unit memory 66 and a handler memory 68, which respectively serve as both program and working memories for the processor unit and the message handler. The processor memory 46 also includes an accelerator-configuration registry 70 and a message-configuration registry 72, which store respective configuration data that allow the host processor 42 to configure the functioning of the accelerator 44 and the structure of the messages that the message handler 64 generates.

The pipeline accelerator 44 is disposed on at least one PLIC (not shown) and includes hardwired pipelines $74_1$-$74_n$, which process respective data without executing program instructions. The firmware memory 52 stores the configuration firmware for the accelerator 44. If the accelerator 44 is disposed on multiple PLICs, these PLICs and their respective firmware memories may be disposed on multiple circuit boards, i.e., daughter cards (not shown). The accelerator 44 and daughter cards are discussed further in previously cited U.S. Publication Nos. 2004/0136241 entitled PIPELINE ACCELERATOR FOR IMPROVED COMPUTING ARCHITECTURE AND RELATED SYSTEM AND METHOD and 2004/0130927 entitled PIPELINE ACCELERATOR HAVING MULTIPLE PIPELINE UNITS AND RELATED COMPUTING MACHINE AND METHOD. Alternatively, the accelerator 44 may be disposed on at least one ASIC, and thus may have internal interconnections that are unconfigurable. In this alternative, the machine 40 may omit the firmware memory 52. Furthermore, although the accelerator 44 is shown including multiple pipelines 74, it may include only a single pipeline.

Still referring to FIG. 3, the operation of the peer-vector machine 40 is discussed below according to an embodiment of the invention.

Configuring the Peer-Vector Machine

When the peer-vector machine 40 is first activated, the processing unit 62 configures the message handler 64 and the pipeline accelerator 44 (where the accelerator is configurable) so that the machine will execute the desired algorithm. Specifically, the processing unit 62 executes a host application program that is stored in the memory 66 and that causes the processing unit to configure the message handler 64 and the accelerator 44 as discussed below.

To configure the message handler 64, the processing unit 62 retrieves message-format information from the registry 72 and provides this format information to the message handler, which stores this information in the memory 68. When the machine 40 processes data as discussed below, the message handler 64 uses this format information to generate and decipher data messages that have a desired format. In one embodiment, the format information is written in Extensible Markup Language (XML), although it can be written in another language or data format. Because the processing unit 62 configures the message handler 64 each time the peer-vector machine 40 is activated, one can modify the message format merely by modifying the format information stored in the registry 72. Alternatively, an external message-configuration library (not shown) can store information for multiple message formats, and one can design and/or modify the host application so that the processing unit 62 updates the registry 72 from selected parts of the library, and then downloads the desired format information from the updated registry to the message handler 64. The message format and the generating and deciphering of messages are further discussed below and in previously cited U.S. Publication No. 2004/0181621 entitled COMPUTING MACHINE HAVING IMPROVED COMPUTING ARCHITECTURE AND RELATED SYSTEM AND METHOD.

Similarly, to configure the interconnection layout of the pipeline accelerator 44, the processing unit 62 retrieves configuration firmware from the registry 70 and downloads this firmware to the memory 52 via the message handler 64 and the bus 50. The accelerator 44 then configures itself by downloading the firmware from the memory 52 into its interconnection-configuration registers (not shown). Because the processing unit 62 configures the accelerator 44 each time the peer-vector machine 40 is activated, one can modify the interconnection-layout—and thus the functioning—of the accelerator 44 merely by modifying the firmware stored in the registry 70. Alternatively, an external accelerator-configuration library (not shown) can store firmware for multiple configurations of the accelerator 44, and one can design and/or modify the host application so that the processing unit 62 updates the registry 70 from selected parts of the library, and then downloads the desired firmware from the updated registry to the memory 52. Furthermore, the external library or the registry 70 may store firmware modules that define different portions and/or functions of the accelerator 44. Therefore, one can use these modules to facilitate the design and/or modification of the accelerator 44. In addition, the processing unit 62 may use these modules to modify the accelerator 44 while the machine 40 is processing data. The interconnection-configuration of the accelerator 44 and the firmware modules are discussed further in previously cited U.S. Publication No. 2004/0170070 entitled PROGRAMMABLE CIRCUIT AND RELATED COMPUTING MACHINE AND METHOD.

The processing unit 62 may also "soft configure" the pipeline accelerator 44 while the peer-vector machine 40 is processing data. That is, the processing unit 62 may configure the functioning of the accelerator 44 without altering the accelerator's interconnection layout. Such soft configuration is discussed further below and in U.S. Publication No. 2004/0136241 entitled PIPELINE ACCELERATOR FOR IMPROVED COMPUTING ARCHITECTURE AND RELATED SYSTEM AND METHOD.

Processing Data with the Peer-Vector Machine

In general, the peer-vector machine 40 effectively divides the processing of raw data between the host processor 42 and the pipeline accelerator 44. For example, the host processor 42 may perform most or all of the decision-making operations related to the data, and the accelerator 44 may perform most or all of the mathematically intensive operations on the data. However, the machine 40 can divide the data processing in any desired manner.

Operation of the Host Processor

Figure 4:
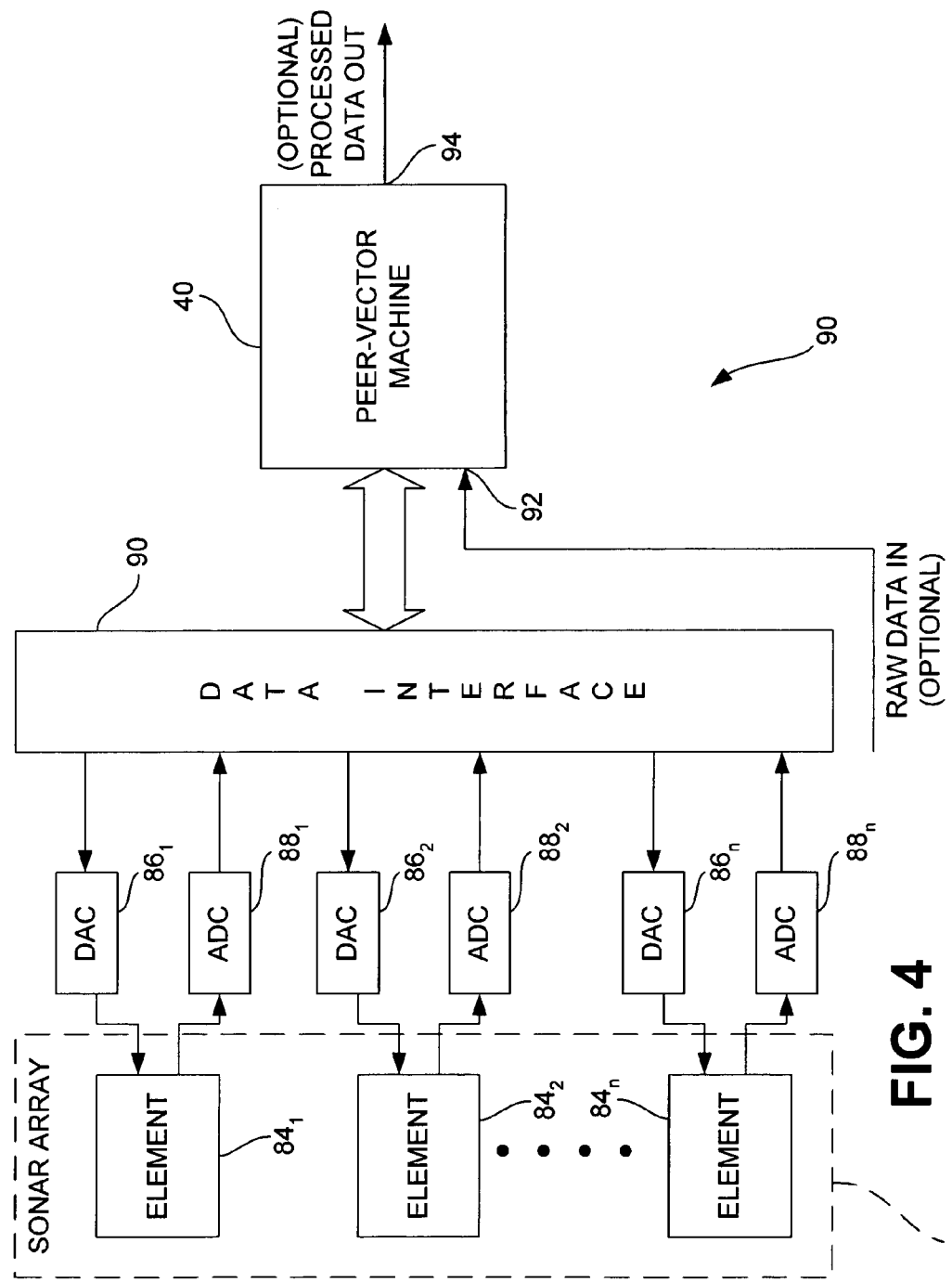
FIG. 4 is a schematic block diagram of an electronic system that incorporates the peer-vector computing machine of FIG. 3 according to an embodiment of the invention.

In one embodiment, the host processor 42 receives the raw data from and provides the resulting processed data to a remote device such as a sonar array (FIG. 4).

The host processor 42 first receives the raw data from the remote device via the input port 54 or the bus 50. The peer-vector machine 40 may include a FIFO (not shown) for buffering the received raw data.

Next, the processing unit 62 prepares the raw data for processing by the pipeline accelerator 44. For example, the unit 62 may determine, e.g., which of the raw data to send to the accelerator 44 or in which sequence to send the raw data. Or, the unit 62 may process the raw data to generate intermediate data for sending to the accelerator 44. The preparation of the raw data is further discussed in previously cited U.S. Publication No. 2004/0181621 entitled COMPUTING MACHINE HAVING IMPROVED COMPUTING ARCHITECTURE AND RELATED SYSTEM AND METHOD.

While preparing the raw data, the processing unit 54 may also generate one or more "soft-configuration" commands to modify the functioning of the accelerator 44. Unlike the firmware that configures the interconnection layout of the accelerator 44 when the machine 40 is activated, a soft-configuration command controls the functioning of the accelerator without altering its interconnection layout. For example, a soft-configuration command may control the size of the data strings (e.g., 32 bits or 64 bits) that the accelerator 44 processes. Soft configuration of the accelerator 44 is discussed further in previously cited U.S. Publication No. 2004/0136241 entitled PIPELINE ACCELERATOR FOR IMPROVED COMPUTING ARCHITECTURE AND RELATED SYSTEM AND METHOD.

The processing unit 62 then loads the prepared data and/or soft-configuration command(s) into a corresponding location of the interface memory 48, which acts as a FIFO buffer between the unit 62 and the accelerator 44.

Next, the message handler 64 retrieves the prepared data and/or software command(s) from the interface memory 48 and generates message objects that include the data and/or command(s) and related information. Typically, the accelerator 44 needs four identifiers that describe the data/command(s) and the related information (collectively "information"): a) the information's intended destination (e.g., the pipeline $74_1$), b) the priority (e.g., should the accelerator process this data before or after previously received data), c) the length or the end of the message object, and d) the unique instance of the data (e.g., sensor signal number nine from an array of one thousand sensors). To facilitate this determination, the message handler 64 generates message objects that have a predetermined format as discussed above. In addition to the prepared data/soft-configuration command(s), a message object typically includes a header that includes the four above-described identifiers and that may also include identifiers that describe the type of information that object includes (e.g., data, command), and the algorithm by which the data is to be processed. This latter identifier is useful where the destination pipeline 74 implements multiple algorithms. The handler 64 may retrieve the header information from the interface memory 48, or may generate the header based on the location within the interface memory from which it retrieves the prepared data or command(s). By deciphering the message header, the router 61 and/or the accelerator 44 can direct the information within the message object to the desired destination, and cause that destination to process the information in a desired sequence.

Alternative embodiments for generating the message objects exist. For example, although each message object is described as including either data or a soft-configuration command, a single message object may include both data and one or more commands. Furthermore, although the message handler 64 is described as receiving the data and commands from the interface memory 48, it may receive the data and commands directly from the processing unit 54.

The generation of message objects is discussed further in previously cited U.S. Publication No. 2004/0181621 entitled COMPUTING MACHINE HAVING IMPROVED COMPUTING ARCHITECTURE AND RELATED SYSTEM AND METHOD.

Pipeline Accelerator

The pipeline accelerator 44 receives and deciphers the message objects from the message handler 64 and effectively directs the data and/or commands within the objects to the desired destination(s). This technique is particularly useful where the number of algorithms implemented by the processing unit 62 and the pipelines 74 are relatively small, and thus the router 61 can be omitted. Alternatively, where the number of algorithms implemented by the processing unit 62 or the number pipelines 74 is relatively large, the router 61 receives and deciphers the message objects from the message handler 64 and effectively directs the data and/or commands within the objects to the desired destination(s) within the accelerator 44.

In one embodiment where there are small numbers of processing-unit algorithms and pipelines 74, each pipeline simultaneously receives a message object and analyzes the header to determine whether or not it is an intended recipient of the message. If the message object is intended for a particular pipeline 74, then that pipeline deciphers the message and processes the recovered data/command(s). If, however, the message object is not intended for a particular pipeline 74, then that pipeline ignores the message object. For example, suppose a message object includes data for processing by the pipeline $74_1$. Therefore, the pipeline $74_1$ analyzes the message header, determines that it is an intended destination for the data, recovers the data from the message, and processes the recovered data. Conversely, each of the pipelines $74_2$-$74_n$ analyzes the message header, determines that it is not an intended destination for the data, and thus does not recover or process the data. If the data within the message object is intended for multiple pipelines 74, then the message handler 64 generates and sends a sequence of respective message objects that include the same data, one message for each destination pipeline. Alternatively, the message handler 64 may simultaneously send the data to all of the destination pipelines 74 by sending a single message object having a header that identifies all of the destination pipelines. Recovering data and soft-configuration commands from message objects is discussed further in previously cited U.S. Publication No. 2004/0136241 entitled PIPELINE ACCELERATOR FOR IMPROVED COMPUTING ARCHITECTURE AND RELATED SYSTEM AND METHOD.

In another embodiment where there are large numbers of processing-unit processes or pipelines 74, each pipeline receives message objects from the router 61. Although the router 61 should ideally send message objects only to the target pipeline 74, the target pipeline still analyzes the header to determine whether or not it is an intended recipient of the message. Such an analysis identifies potential message routing errors, i.e., exceptions. If the message object is intended for target pipeline 74, then that pipeline deciphers the message and processes the recovered data/command(s). If, however, the message object is not intended for the target pipeline 74, then that pipeline ignores the processing for that message object, and may also issue a new message to the host processor 42 indicating that a routing exception has occurred. Handling of routing exceptions is discussed in previously cited U.S. Publication No. 2004/0181621 entitled COMPUTING MACHINE HAVING IMPROVED COMPUTING ARCHITECTURE AND RELATED SYSTEM AND METHOD.

Next, the pipeline accelerator 44 processes the incoming data and/or commands recovered from the message objects.

Figure 2:
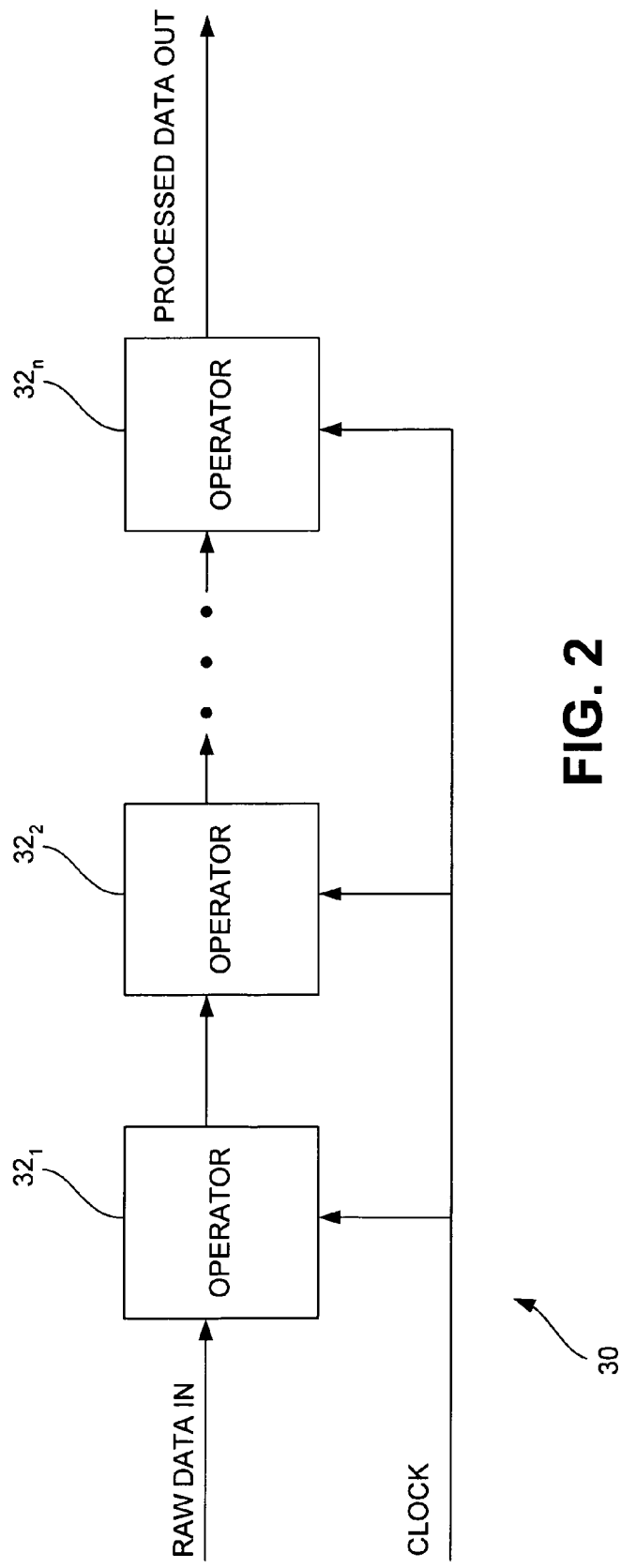
FIG. 2 is a block diagram of a conventional hardwired pipeline.

For data, the destination pipeline or pipelines 74 perform a respective operation or operations on the data. As discussed in conjunction with FIG. 2, because the pipelines 74 do not execute program instructions, they can often process the data at a rate that is substantially the same as the frequency of the pipeline clock.

In a first embodiment, a single pipeline 74 generates resulting data by processing the incoming data.

In a second embodiment, multiple pipelines 74 generate resulting data by serially processing the incoming data. For example, the pipeline 74 may generate first intermediate data by performing a first operation on the incoming data. Next, the pipeline $74_2$ may generate second intermediate data by performing a second operation on the first intermediate data, and so on, until the final pipeline 74 in the chain generates the result data.

In a third embodiment, multiple pipelines 74 generate the resulting data by processing the incoming data in parallel. For example, the pipeline $74_1$ may generate a first set of resulting data by performing a first operation on a first set of the incoming data. At the same time, the pipeline $74_2$ may generate a second set of resulting data by performing a second operation on a second set of the incoming data, and so on.

Alternatively, the pipelines 74 may generate resulting data from the incoming data according to any combination of the above three embodiments. For example, the pipeline $74_1$ may generate a first set of resulting data by performing a first operation on a first set of the incoming data. At the same time, the pipelines $74_2$ and $74_n$ may generate a second set of resulting data by serially performing second and third operations on a second set of the incoming data.

In any of the above embodiments and alternatives, a single pipeline 74 may perform multiple operations. For example, the pipeline $74_1$ may receive data, generate first intermediate data by performing a first operation on the received data, temporarily store the first intermediated data, generate second intermediate data by performing a second operation on the first intermediate data, and so on, until it generates result data. There are a number of techniques for causing the pipeline $74_1$ to switch from performing the first operation to performing the second operation, and so on. Such techniques are discussed in previously cited U.S. patent application Ser. No. 10/683,929 entitled PIPELINE ACCELERATOR FOR IMPROVED COMPUTING ARCHITECTURE AND RELATED SYSTEM AND METHOD.

For a soft-configuration command, the accelerator 44 sets the bits in the corresponding soft-configuration register(s) (not shown) as indicated by the message header. As discussed above, setting these bits typically changes the functioning of the accelerator 44 without changing its interconnection layout. This is similar to setting bits in a control register of a processor for, e.g., setting an external pin as an input pin or an output pin or selecting an addressing mode. Furthermore, a soft-configuration command can partition a register or table (an array of registers) for holding data. Another soft-configuration command or an operation performed by the accelerator 44 may load data into the soft-configured register or table. Soft configuration of the accelerator 44 is discussed further in previously cited U.S. Publication No. 2004/0136241 entitled PIPELINE ACCELERATOR FOR IMPROVED COMPUTING ARCHITECTURE AND RELATED SYSTEM AND METHOD.

Next, the pipeline accelerator 44 provides the resulting data to the host processor 42 via the router 61 (or directly if the router is omitted) for further processing.

Alternatively, the accelerator 44 provides the resulting data to the remote destination (FIG. 4) either directly via the output port 94 (FIG. 4), or indirectly via the router 61 (if present), the bus 50, the host processor 42, and the output port 58. Consequently, in this alternative embodiment, the resulting data generated by the accelerator 44 is the final processed data.

When the accelerator 44 provides the resulting data to the host processor 42—either for further processing or for pass through to the remote device (FIG. 4)—it sends this data in a message object that has the same format as the message objects generated by the message handler 64. Like the message objects generated by the message handler 64, the message objects generated by the accelerator 44 include headers that specify, e.g., the destination and the priority of the resulting data. For example, the header may instruct the message handler 64 to pass through the resulting data to the remote device via the port 58, or may specify which portion of the program executed by the processing unit 62 is to control the processing of the data. By using the same message format, the accelerator 44 has the same interface layer as the host processor 42. This facilitates designing and modifying the peer-vector machine 40, particularly if the interface layer is an industry standard.

The structure and operation of the pipeline accelerator 44 and the pipelines 66 are discussed further in previously cited U.S. Publication No. 2004/0136241 entitled PIPELINE ACCELERATOR FOR IMPROVED COMPUTING ARCHITECTURE AND RELATED SYSTEM AND METHOD.

Receiving and Processing from the Pipeline Accelerator with the Host Processor When it receives a message object from the accelerator 44, the message handler 64 first deciphers the message header and directs the recovered data to the indicated destination.

If the header indicates that the data is to be passed to the remote device (FIG. 4) via the port 58, then the message handler 64 may provide the data directly to the port 58, or to a port FIFO buffer (not shown) formed in the interface memory 48 or in another memory and then from the buffer to the port 58. Multiple ports 58 and multiple respective remote devices are also contemplated.

If, however, the header indicates that the processing unit 62 is to further process the data, then the message handler 62 stores the data in a location of the interface memory 48 that corresponds to the portion of the processing-unit program that is to control the processing of the data. More specifically, the same header now indirectly indicates which portion(s) of the program executed by the processing unit 54 is(are) to control the processing of the data. Consequently, the message handler 64 stores the data in the location (such as a FIFO) of the interface memory 48 corresponding to this program portion.

As discussed above, the interface memory 48 acts as a buffer between the accelerator 44 and the processing unit 62, and thus allows the transfer of data when the processing unit is not synchronized to the accelerator. For example, this lack of synchronization may occur when the accelerator 44 processes data faster than the processing unit 62. By using the interface memory 48, the accelerator 44 is not slowed by the slower response of the processing unit 62. This also avoids the inefficiency penalties associated with the processing unit's indeterminate response time to handling interrupts. The indeterminate handling by the processing unit 62 of the accelerator 44 output messages would unnecessarily complicate the accelerator's design by forcing the designer to provide either: a) storage and handling for the backed up output messages, or b) idling controls throughout the pipeline to prevent the backed up messages from being overwritten. Therefore, the use of interface memory 48, which acts as a buffer between the accelerator 44 and the processing unit 62, has several desirable consequences a) accelerators are easier to design, b) accelerators need less infrastructure and can hold larger PLIC applications, c) accelerators can be streamlined to run faster because output data is not "blocked" by a slower processor.

Then, for data that the message handler 64 has stored in the interface memory 48, the processing unit 62 retrieves the data from the interface memory. The processing unit 62 may poll the interface memory 48 to determine when new data has arrived in a particular location, or the message handler 64 may generate an interrupt or other signal that notifies the processing unit of the data's arrival. In one embodiment, before the processing unit 62 retrieves data, the message handler 64 generates a message object that includes the data. More specifically, one may design the program executed by the processing unit 62 to receive data in message objects. The message handler 64, therefore, could store a message object in the interface memory 48 instead of storing only the data. But a message object typically occupies significantly more memory space than does the data it contains. Consequently, to save memory, the message handler 64 deciphers a message object from the pipeline accelerator 44, stores the data in the memory 48, and then effectively regenerates the message object when the processing unit 62 is ready to receive the data. Then, the processing unit 62 deciphers the message object and processes the data under the control of the program portion identified in the message header.

Next, the processor unit 62 processes the retrieved data under the control of the destination portion of the program, generates processed data, and stores the processed data in a location of the interface memory 48 that corresponds to the intended destination of the processed data.

Then, the message handler 64 retrieves the processed data and provides it to the indicated destination. To retrieve the processed data, the message handler 64 may poll the memory 48 to determine when the data has arrived, or the processing unit 62 may notify the message handler of the data's arrival with an interrupt or other signal. To provide the processed data to its intended destination, the message handler 64 may generate a message object that includes the data, and send the message object back to the accelerator 44 for further processing of the data. Or, the handler 56 may send the data to the port 58, or to another location of the memory 48 for further processing by the processing unit 62.

The host processor's receiving and processing of data from the pipeline accelerator 44 is discussed further in previously cited U.S. Publication No. 2004/0181621 entitled COMPUTING MACHINE HAVING IMPROVED COMPUTING ARCHITECTURE AND RELATED SYSTEM AND METHOD.

Alternative Data Processing Techniques Using the Peer-Vector Machine

Still referring to FIG. 3, there exist alternatives to the above-described embodiments in which the host processor 42 receives and processes data, and then sends the data to the pipeline accelerator 44 for further processing.

In one alternative, the host processor 42 performs all of the processing on at least some of the data, and thus does not send this data to the pipeline accelerator 44 for further processing.

In another alternative, the pipeline accelerator 44 receives the raw data directly from the remote device (FIG. 4) via the port 92 (FIG. 4) and processes the raw data. The accelerator 44 may then send the processed data directly back to the remote device via the port 94, or may send the processed data to the host processor 42 for further processing. In the latter case, the accelerator 44 may encapsulate the data in message objects as discussed above.

In yet another alternative, the accelerator 44 may include, in addition to the hardwired pipelines 74, one or more instruction-executing processors, such as a Digital Signal Processor (DSP), to complement the number-crunching abilities of the pipelines.

Example Implementation of the Peer-Vector Machine

Still referring to FIG. 3, in one embodiment, the pipeline bus 50 is a standard 133 MHz PCI bus, the pipelines 74 are included on one or more standard PMC cards, and the memory 52 is one or flash memories that are each located on a respective PMC card.

Example Application of the Peer-Vector Machine

FIG. 4 is a block diagram of a sonar system 80 that incorporates the peer-vector machine 40 of FIG. 3 according to an embodiment of the invention. In addition to the machine 40, the system 80 includes an array 82 of transducer elements $84_1$-$84_n$ for receiving and transmitting sonar signals, digital-to-analog converters (DACs) $86_1$-$86_n$, analog-to-digital converters (ADCs) $88_1$-$88_n$, and a data interface 90. Because generating and processing sonar signals are often mathematically intensive functions, the machine 40 can often perform these functions more quickly and efficiently than a conventional computing machine—such as the multi-processor machine 10 (FIG. 1)—can for a given clock frequency as discussed above in conjunction with FIG. 3.

During a transmit mode of operation, the array 82 transmits a sonar signal into a medium such as water (not shown). First, the peer-vector machine 40 converts raw signal data received on the port 92 into n digital signals, one for each of the array elements 84. The magnitudes and phases of these signals dictate the transmission-beam pattern of the array 82. Next, the machine 40 provides these digital signals to the interface 90, which provides these signals to the respective DACs 86 for conversion into respective analog signals. For example, the interface 90 may act as a buffer that serially receives the digital signals from the machine 40, stores these signals until it receives and buffers all n of them, and then simultaneously provides these sequential signal samples to the respective DACs 86. Then, the transducer elements 84 convert these analog signals into respective sound waves, which interfere with one another to form the beams of a sonar signal.

During a receive mode of operation, the array 82 receives a sonar signal from the medium (not shown). The received sonar signal is composed of the portion of the transmitted sonar signal that is reflected by remote objects and the sound energy emitted by the environment and the remote objects. First, the transducer elements 84 receive respective sound waves that compose the sonar signal, convert these sound waves into n analog signals, and provide these analog signals to the ADCs 88 for conversion into n respective digital signals. Next, the interface 90 provides these digital signals to the peer-vector machine 40 for processing. For example, the interface 90 may act as a buffer that receives the digital signals from the ADCs 88 in parallel and then serially provides these signals to the machine 40. The processing that the machine 40 performs on the digital signals dictates the receive-beam pattern of the array 82. Additional processing steps such as filtering, band shifting, spectral transformation (e.g., the Fourier Transform), and convolution are applied to the digital signals. The machine 40 then provides the processed signal data via the port 94 to another apparatus such as a display device for viewing located objects.

Although discussed in conjunction with the sonar system 80, systems other than sonar systems may also incorporate the peer-vector machine 40.

The preceding discussion is presented to enable a person skilled in the art to make and use the invention. Various modifications to the embodiments will be readily apparent to those skilled in the art, and the generic principles herein may be applied to other embodiments and applications. Thus, the present invention is not intended to be limited to the embodiments shown, but is to be accorded the widest scope consistent with the principles and features disclosed herein.

What is claimed is:

1. A peer-vector machine, comprising:
    a host processor operable to execute an instruction of a program, to generate first host data in response to the instruction, and to identify configuration information that is separate from the program; and
    a pipeline accelerator coupled to the host processor and operable to receive the identified configuration information,
        configure a portion of the pipeline accelerator in response to the configuration information,
        receive the first host data, and
        generate first pipeline data from the first host data without executing any program instruction.

2. The peer-vector machine of claim 1 wherein the host processor is further operable to:
    receive second data; and
    generate the first host data from the second data.

3. The peer-vector machine of claim 1 wherein the host processor is further operable to:
    receive the first pipeline data from the pipeline accelerator; and
    process the first pipeline data.

4. The peer-vector machine of claim 1 wherein the host processor is further operable to:
    receive the first pipeline data from the pipeline accelerator; and
    generate the first host data from the first pipeline data.

5. The peer-vector machine of claim 1, further comprising:
    an interface memory coupled to the host processor and to the pipeline accelerator and having a first memory section;
    wherein the host processor is operable to,
        store the first host data in the first memory section, and
        provide the first host data from the first memory section to the pipeline accelerator.

6. The peer-vector machine of claim 1, further comprising:
    an interface memory coupled to the host processor and to the pipeline accelerator and having first and second memory sections;
    wherein the host processor is operable to,
        store the first host data in the first memory section,
        provide the first host data from the first memory section to the pipeline accelerator,
        receive the first pipeline data from the pipeline accelerator,
        store the first pipeline data in the second memory section,
        retrieve the first pipeline data from the second memory section to the host processor, and
        process the first pipeline data.

7. The peer-vector machine of claim 1 wherein the host processor is operable to provide the identified configuration information to the pipeline accelerator.

8. The peer-vector machine of claim 1 wherein:
    the identified configuration information comprises firmware; and
    the portion of the pipeline accelerator comprises a programmable-logic integrated circuit that the firmware is operable to configure.

9. A peer-vector machine, comprising:
    a pipeline accelerator operable to generate first pipeline data without executing any program instruction; and
    a host processor coupled to the pipeline accelerator and operable to execute a program, operable to receive the first pipeline data and to generate first host data from the first pipeline data in response to the executing program, and, while not executing the program, operable to configure a portion of the pipeline accelerator to generate the first pipeline data.

10. The peer-vector machine of claim 9 wherein the pipeline accelerator is further operable to:
receive second data; and
generate the first pipeline data from the second data.

11. The peer-vector machine of claim 9 wherein the pipeline accelerator is further operable to:
receive the first host data from the host processor; and
process the first host data.

12. The peer-vector machine of claim 9 wherein the pipeline accelerator is further operable to:
receive the first host data from the host processor; and
generate the first pipeline data from the first host data.

13. The peer-vector machine of claim 9, further comprising:
an interface memory coupled to the pipeline accelerator and to the host processor and having a first memory section; and
wherein the host processor is operable to,
store the first pipeline data from the pipeline accelerator in the first memory section, and
retrieve the first pipeline data from the first memory section.

14. The peer-vector machine of claim 9, further comprising:
an interface memory coupled to the pipeline accelerator and to the host processor and having first and second memory sections;
wherein the host processor is operable to,
store the first pipeline data from the pipeline accelerator in the first memory section,
retrieve the first pipeline data from the first section,
store the first host data in the second memory section, and
provide the first host data from the second memory section to the pipeline accelerator; and
wherein the pipeline accelerator is operable to process the first host data received from the second memory section.

15. A system, comprising:
a device operable to generate raw data;
a host processor coupled to the device and operable to execute an instruction of a program, in response to the instruction operable to generate host data from the raw data, and operable to identify configuration information that is separate from the program; and
a pipeline accelerator coupled to the host processor and operable to
receive the configuration information;
configure at least a portion of the pipeline accelerator in response to the configuration information;
receive the host data,
generate pipeline data from the host data without executing any program instruction; and
provide the pipeline data to a destination remote from the pipeline accelerator.

16. A system, comprising:
a device operable to generate raw data;
a pipeline accelerator coupled to the device and operable to generate pipeline data from the raw data without executing any program instruction; and
a host processor coupled to the pipeline accelerator and operable to execute a program, in response to the program operable to receive the pipeline data and to generate host data from the pipeline data, and, while not executing the program, operable to configure a portion of the pipeline accelerator to generate the pipeline data.

17. A method, comprising:
before executing a first program with a host processor, configuring with the host processor a portion of a pipeline accelerator to generate first pipeline data from first host data;
generating the first host data by executing a first instruction of the program with the host processor; and
generating the first pipeline data from the first host data with the configured pipeline accelerator without executing any program instruction.

18. The method of claim 17, further comprising:
receiving raw data;
wherein generating the first host data comprises generating the first host data from the raw data.

19. The method of claim 17 wherein generating the first host data comprises generating the first host data from the first pipeline data.

20. The method of claim 17, further comprising generating second host data from the first pipeline data by executing an instruction of the program with the host processor.

21. The method of claim 17 wherein configuring the pipeline accelerator comprises configuring a portion of the pipeline accelerator by executing an instruction of a second program with the host processor.

22. A method, comprising:
identifying configuration information with a host processor;
configuring a portion of a pipeline accelerator with the identified configuration information;
generating first pipeline data with the configured pipeline accelerator without executing any program instruction; and
generating first host data from the first pipeline data by executing with the host processor an instruction of a first program that is separate from the identified configuration information.

23. The method of claim 22, further comprising:
receiving raw data;
wherein generating the first pipeline data comprises generating the first pipeline data from the raw data.

24. The method of claim 22 wherein generating the first pipeline data comprises generating the first pipeline data from the first host data.

25. The method of claim 22, further comprising generating second pipeline data from the first host data with the pipeline accelerator.

26. The method of claim 22 wherein identifying the configuration information comprises identifying the configuration information by executing an instruction of a second program with the host processor.

27. A peer-vector machine, comprising:
a host processor operable to execute an instruction of a program, to generate host data in response to the instruction, and to identify configuration information that is separate from the program; and
a pipeline accelerator coupled to the host processor and operable to
receive the identified configuration information,
configure a portion of the pipeline accelerator in response to the configuration information,
receive the host data, and
generate pipeline data from the host data without responding to any program instruction.

28. A peer-vector machine, comprising:
  a pipeline accelerator operable to
    receive host data, and
    generate pipeline data from the host data without receiving any program instruction; and
  a host processor coupled to the pipeline accelerator and operable to execute a program, operable to generate the host data in response to the executing program, and, while not executing the program, operable to configure a portion of the pipeline accelerator to generate the pipeline data.

29. The peer-vector machine of claim 1 wherein the pipeline accelerator is operable to configure the portion of the pipeline accelerator before generating the first pipeline data.

30. The peer-vector machine of claim 1 wherein the pipeline accelerator is operable to configure the portion of the pipeline accelerator before receiving the first host data.

31. The peer-vector machine of claim 1, further comprising:
  an accelerator-configuration registry operable to store the configuration information; and
  wherein the host processor is further operable to transfer the configuration information from the registry to the pipeline accelerator.

32. The peer-vector machine of claim 1 wherein the host processor is operable to identify the configuration information before executing the instruction.

33. The peer-vector machine of claim 9 wherein the host processor is operable to configure the portion of the pipeline accelerator before executing the program.

34. The peer-vector machine of claim 9, further comprising:
  an accelerator-configuration registry operable to store configuration information; and
  wherein the host processor is operable to configure the portion of the pipeline accelerator by transferring the configuration information from the registry to the pipeline accelerator.

* * * * *

UNITED STATES PATENT AND TRADEMARK OFFICE
CERTIFICATE OF CORRECTION

| | | |
|---|---|---|
| PATENT NO. | : 7,418,574 B2 | Page 1 of 1 |
| APPLICATION NO. | : 10/684102 | |
| DATED | : August 26, 2008 | |
| INVENTOR(S) | : Chandan Mathur et al. | |

It is certified that error appears in the above-identified patent and that said Letters Patent is hereby corrected as shown below:

On the Title Page Item (73) Assignee address should read "Betheda, MD (US)"

On the Title Page Item (54) and col. 1, lines 1-4, Title should read "CONFIGURING A PORTION OF A PIPELINE ACCELERTOR TO GENERATE PIPELINE DATA WITHOUT A PROGRAM INSTRUCTION"

Signed and Sealed this

Twenty-fifth Day of November, 2008

JON W. DUDAS
*Director of the United States Patent and Trademark Office*